United States Patent
Manico

Patent Number: 5,402,881
Date of Patent: Apr. 4, 1995

[54] CONTAINER WITH INDEX PRINT SHEET AND CASSETTE

[75] Inventor: Joseph A. Manico, Rochester, N.Y.

[73] Assignee: Eastman Kodak Company, Rochester, N.Y.

[21] Appl. No.: 226,629

[22] Filed: Apr. 12, 1994

[51] Int. Cl.⁶ .......................................... B65B 85/671
[52] U.S. Cl. .................... 206/225; 206/232; 206/455
[58] Field of Search ............... 206/454, 455, 225, 232, 206/389, 45.34, 44 B; 40/124, 156, 159.2, 361

[56] References Cited

U.S. PATENT DOCUMENTS

| | | | |
|---|---|---|---|
| 3,546,053 | 12/1970 | Goldberg et al. | 161/38 |
| 4,591,904 | 5/1986 | Urabe et al. | 358/75 |
| 4,720,733 | 1/1988 | Ohtake et al. | 355/50 |
| 4,805,039 | 2/1989 | Otake et al. | 358/335 |
| 4,966,285 | 10/1990 | Otake et al. | 206/455 |
| 5,031,773 | 7/1991 | Manico et al. | 206/455 |
| 5,199,568 | 4/1993 | Streit et al. | 206/443 |
| 5,251,744 | 10/1993 | Dziersk et al. | 206/455 X |
| 5,251,746 | 10/1993 | Gresh et al. | 206/232 |
| 5,251,747 | 10/1993 | Hansen et al. | 206/232 |
| 5,263,579 | 11/1993 | Blackman | 206/232 |
| 5,314,066 | 5/1994 | Gresh | 206/455 X |

*Primary Examiner*—Jacob K. Ackun, Jr.
*Attorney, Agent, or Firm*—Roger A. Fields

[57] ABSTRACT

An image package comprises a cassette housing an image bearing medium having a plurality of images recorded on it, an index print sheet on which are printed a plurality of pictures that match the plurality of images on the image bearing medium, and a storage container holding the cassette and the index print sheet. According to the invention, the storage container has a cylindrical body, including a transparent cylindrical wall, and a cap that covers an open top end of the cylindrical body. The cassette is positioned inside the cylindrical body to be removed at the open top end. The index print sheet is rolled up into a cylinder surrounding the cassette inside the cylindrical body with the plurality of pictures visible through the transparent cylindrical wall. In an alternative embodiment, the index print sheet is rolled up directly over a loose roll of negatives inside the cylindrical body.

4 Claims, 3 Drawing Sheets

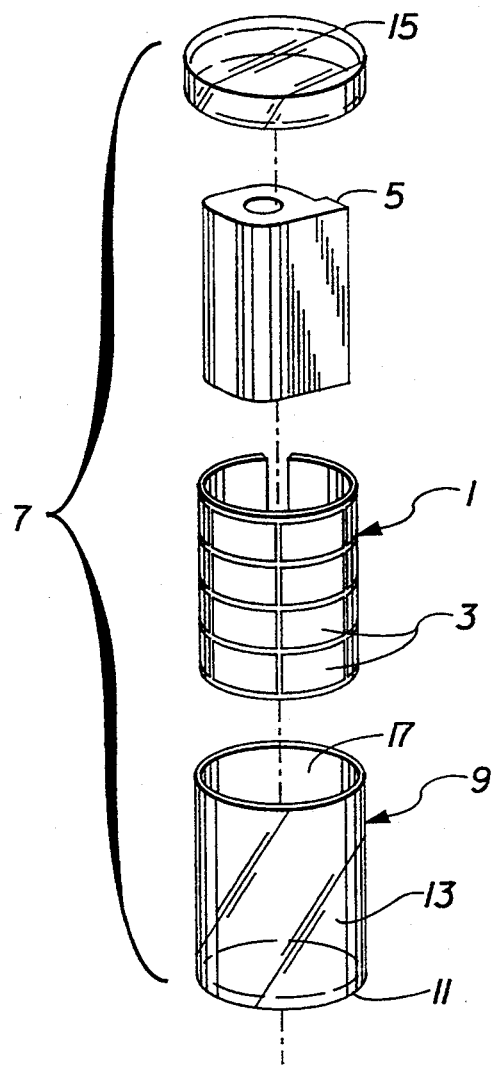
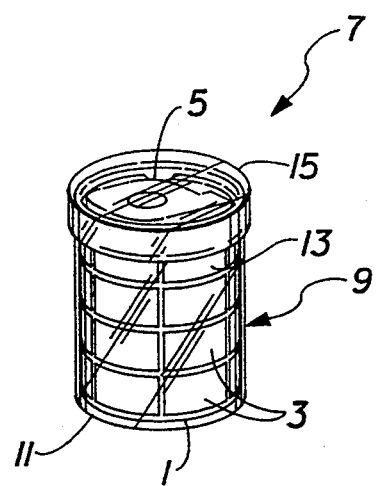
FIG. 2
FIG. 3

CONTAINER WITH INDEX PRINT SHEET AND CASSETTE

FIELD OF THE INVENTION

The invention relates generally to the field of photography and in particular to an image package comprising a cassette housing an image bearing medium having a plurality of images recorded on it, an index print sheet on which are printed a plurality of pictures that match the plurality of images on the image bearing medium, and a storage container holding the cassette and the index print sheet.

BACKGROUND OF THE INVENTION

Generally, a photographic processing laboratory gives the customer a processed negative film and corresponding photographs which are enlarged and printed from the film. The negative film is usually cut into several sections, each one containing the same number of negatives and inserted in an open-ended sheath or sleeve. Many customers store the photographs in an envelope together with the negatives, making it difficult to later find a particular photograph or negative.

Index or contact print sheets have been proposed which make it easier to find a particular negative. An index print sheet has printed on it several rows of pictures that match the negatives. The pictures are numbered in accordance with numbering of the negatives as shown in prior art U.S. Pat. Nos. 5,263,579, issued Nov. 23, 1993, and No. 4,966,285, issued Oct. 30, 1990.

Prior art U.S. Pat. No. 5,263,579, issued Nov. 23, 1993, discloses a storage container for a negative return cassette holding a roll of negatives and for an index print sheet on which are printed several rows of pictures that match the negatives. The storage container comprises a transparent sheet-like cover having a length and width slightly larger than corresponding dimensions of the index print sheet to flatly overlay the index print sheet, and a sheet-like back having a length and width similar to the length and width of the cover to store the index print snugly between the cover and the back with the rows of pictures on the index print sheet visible only through the cover. The back includes an integrally formed nest blown outward to hold the negative return cassette out of the way of the index print sheet.

SUMMARY OF THE INVENTION

The invention is directed to providing an image package comprising a cassette housing an image bearing medium having a plurality of images recorded on it, an index print sheet on which are printed a plurality of pictures that match the plurality of images on the image bearing medium, and a storage container holding the cassette and the index print sheet, like the image package disclosed in prior art U.S. Pat. No. 5,263,579, but which advantageously occupies less space than the storage container disclosed in the patent. Thus, the invention is characterized in that:

the storage container has a cylindrical body, including a transparent cylindrical wall, and a cap that covers an open top end of the cylindrical body;

the cassette is positioned inside the cylindrical body to be removed at the open top end; and the index print sheet is rolled up into a cylinder surrounding the cassette inside the cylindrical body with the plurality of pictures visible through the transparent cylindrical wall According to another aspect of the invention, an image package comprising an index print sheet on which are printed a plurality of pictures that match the plurality of images on the image bearing medium, and a storage container holding the index print sheet, is characterized in that:

the storage container has a cylindrical body, including a transparent cylindrical wall, and a cap that covers an open top end of the cylindrical body;

a loose roll of negatives is positioned inside the cylindrical body to be removed at the open top end; and the index print sheet is rolled up directly over the roll of negatives inside the cylindrical body with the plurality of pictures visible through the transparent cylindrical wall.

BRIEF DESCRIPTION OF THE DRAWINGS

FIG. 2 is an unassembled perspective view of an image package according to a preferred embodiment of the invention;

FIG. 3 is an assembled perspective view of the image package;

DETAILED DESCRIPTION OF THE INVENTION

Preferred Embodiment

Figure 1:
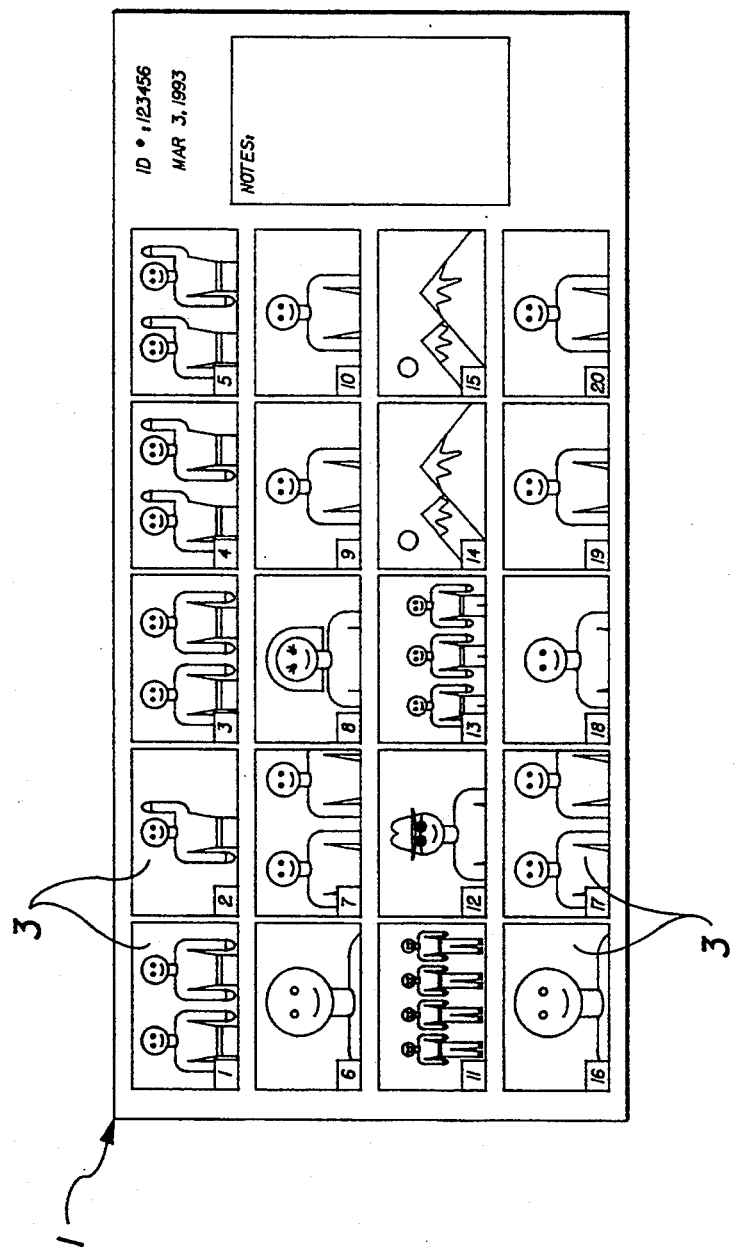
FIG. 1 is a plan view of an index print sheet.

Referring now to the drawings, FIGS. 1 and 2 illustrate an index print sheet 1 similar to the one disclosed in prior art U.S. Pat. No. 5,263,579, but which is reduced in size. The index print sheet 1 has a series of twenty pictures 3, printed on the sheet in four rows, that match negatives wound in a roll inside a negative return cassette 5. The pictures 3 are numbered "1" to "20" in accordance with numbering of the negatives.

An image package 7 comprising the index print sheet 1, the negative return cassette 5, and a transparent storage container or canister 9 is illustrated in an unassembled state in FIG. 2 and in an assembled state in FIG. 3. The transparent storage container 9 has a cylindrical body 11, including a cylindrical wall 13, and a cap 15 that covers an open top end 17 of the cylindrical body. The negative return cassette 5 is intended to be positioned inside the cylindrical body 11 to be removed at the top open end 17. The index print sheet 1 is intended to be rolled up into a cylinder surrounding the cassette 5 inside the cylindrical body 11 with the series of twenty pictures 3 visible through the cylindrical wall 13. See FIG. 3. The index print sheet 1 is constructed of a resilient material to make it inherently biased to straighten when rolled up into a cylinder surrounding the cassette 5 in order that the pictures 3 are urged flush against the cylindrical wall 13.

Alternative Embodiment

Figure 4:
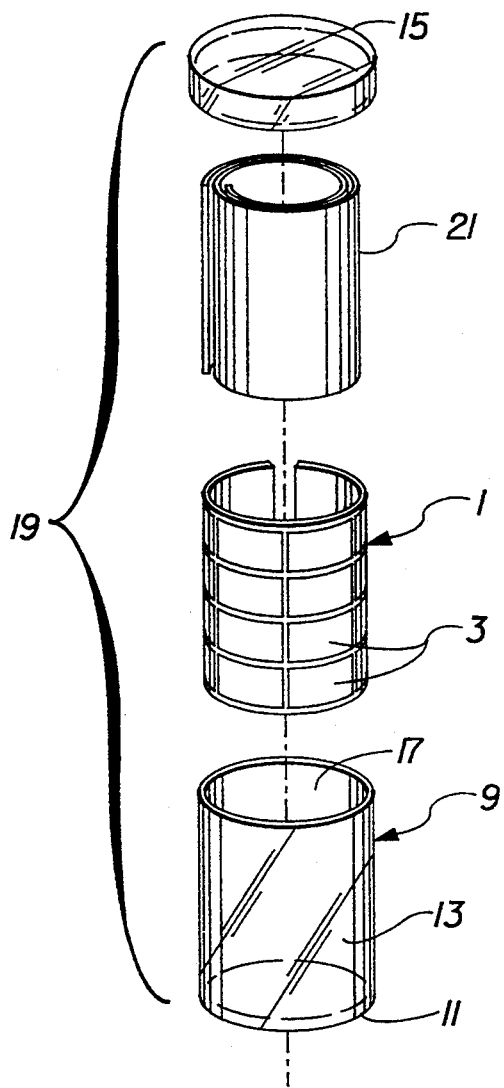
FIG. 4 is an unassembled perspective view of an image package according to an alternate embodiment of the invention.
Figure 5:
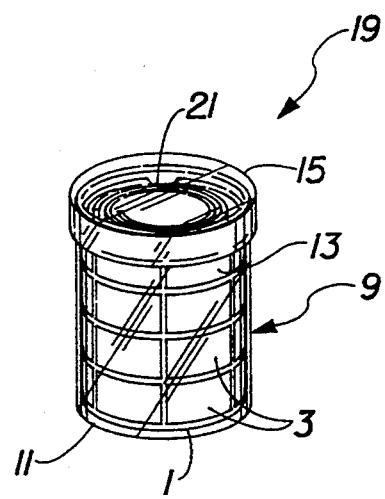
FIG. 5 is an assembled perspective view of the image package.

An image package 19 comprising the index print sheet 1, the transparent storage container 9 and a loose roll 21 of negatives (without the negative return cassette 5) is illustrated in an unassembled state in FIG. 4 and in an assembled state in FIG. 5. The loose roll 21 of negatives is intended to be positioned inside the cylindrical body 11 to be removed at the top open end 17. The index print sheet 1 is intended to be rolled up into a cylinder surrounding the loose roll 21 of negatives inside the cylindrical body 11 with the series of twenty pictures 3 visible through the cylindrical wall 13. See FIG. 5.

The invention has been described with reference to preferred and alternative embodiments. However, it will be appreciated that variations and modifications can be effected by a person of ordinary skill in the art without departing from the scope of the invention. For example, instead of the storage container 9 having the cylindrical body 11, it can have an oval-shaped or otherwise rounded body, or it can have a squared or rectangular-shaped body.

PARTS LIST 1. index print sheet
3. pictures
5. negative return cassette
7. image package
9. transparent storage container
11. cylindrical body
13. cylindrical wall
15. cap
17. open top end
19. image package
21. roll of negatives

I claim:

1. An image package comprising a cassette housing an image bearing medium having a plurality of images recorded on it, an index print sheet on which are printed a plurality of pictures that match the plurality of images on said image bearing medium, and a storage container holding said cassette and said index print sheet, is characterized in that:

said storage container has a cylindrical body, including a transparent cylindrical wall, and a cap that covers an open top end of said cylindrical body;

said cassette is positioned inside said cylindrical body to be removed at said open top end; and said index print sheet is rolled up into a cylinder surrounding said cassette inside said cylindrical body with said plurality of pictures visible through said transparent cylindrical wall.

2. An image package as recited in claim 1, wherein said index print sheet is inherently biased to straighten when rolled up into a cylinder surrounding said cassette in order that said plurality of pictures are urged flush against said transparent cylindrical wall.

3. An image package comprising an image bearing medium having a plurality of images recorded thereon, an index print sheet on which are printed a plurality of pictures that match the plurality of images on said image bearing medium, and a storage container holding said image bearing medium and said index print sheet, is characterized in that:

said storage container has a cylindrical body, including a transparent cylindrical wall, and a cap that covers an open top end of said cylindrical body;

said image bearing medium including a loose roll of negatives positioned inside said cylindrical body to be removed at said open top end; and said index print sheet is rolled up directly over said roll of negatives inside said cylindrical body with said plurality of pictures visible through said transparent cylindrical wall.

4. An image package comprising a cassette housing an image bearing medium having a plurality images recorded on it, an index print sheet on which are printed a plurality of pictures that match the plurality of images on said image bearing medium, and a storage container holding said cassette and said index print sheet, is characterized in that:

said storage container has an enclosure body, including a transparent wall, and a cap that covers an open top end of said enclosure body;

said cassette is positioned inside said enclosure body to be removed at said open top end; and said index print sheet is rolled completely around said cassette inside said enclosure body and located against said transparent wall, with said plurality of pictures visible through said transparent wall.

* * * * *